(12) United States Patent
Jalalmaab et al.

(10) Patent No.: US 12,552,456 B2
(45) Date of Patent: Feb. 17, 2026

(54) VEHICULAR TRAILERING ASSIST SYSTEM

(71) Applicant: Magna Electronics Inc., Auburn Hills, MI (US)

(72) Inventors: Mohammadmehdi Jalalmaab, Waterloo (CA); Jyothi P. Gali, Rochester Hills, MI (US); Devendra Bajpai, Bloomfield Hills, MI (US); Alexander Velichko, Toronto (CA)

(73) Assignee: Magna Electronics Inc., Auburn Hills, MI (US)

( * ) Notice: Subject to any disclaimer, the term of this patent is extended or adjusted under 35 U.S.C. 154(b) by 702 days.

(21) Appl. No.: 16/948,253

(22) Filed: Sep. 10, 2020

(65) Prior Publication Data

US 2021/0078634 A1    Mar. 18, 2021

Related U.S. Application Data

(60) Provisional application No. 62/899,936, filed on Sep. 13, 2019.

(51) Int. Cl.
*G06T 7/00* (2017.01)
*B60R 1/00* (2022.01)
(Continued)

(52) U.S. Cl.
CPC .......... *B62D 15/0285* (2013.01); *B60R 1/003* (2013.01); *G05D 1/0212* (2013.01);
(Continued)

(58) Field of Classification Search
CPC ................. B62D 15/0285; G06T 7/70; G06T 2207/30241; G06T 2207/30252;
(Continued)

(56) References Cited

U.S. PATENT DOCUMENTS 5,550,677 A    8/1996   Schofield et al.
5,670,935 A    9/1997   Schofield et al.
(Continued)

OTHER PUBLICATIONS

Augie Widyotriatmo, "Orienting Head-Truck in the Design of Truck-Trailer Path Following Control," Oct. 17, 2018, 18th International Conference on Control, Automation, and Systems, whole document. (Year: 2018).*

*Primary Examiner* — Tiffany P Young
(74) *Attorney, Agent, or Firm* — HONIGMAN LLP

(57) ABSTRACT

A vehicular trailering assist system includes a rearward viewing camera at a vehicle and an electronic control unit (ECU). During a reversing maneuver of the vehicle and trailer while the vehicle is in motion and the trailer is hitched to the vehicle, the ECU (i) determines a target trajectory for the trailer, (ii) determines a lateral path deviation of the trailer that represents a deviation of a current trajectory of the trailer from the target trajectory for the trailer, (iii) determines a trailer heading angle correction, and (iv) determines a target trailer angle of the trailer relative to the vehicle based on the current trailer angle of the trailer and the trailer heading angle correction. Responsive to determination of the target trailer angle of the trailer, the ECU controls steering of the vehicle to achieve the target trailer angle and direct the vehicle and the trailer towards the target trajectory.

19 Claims, 9 Drawing Sheets

(51) Int. Cl.
*B62D 15/02* (2006.01)
*G05D 1/00* (2006.01)
*G06T 7/70* (2017.01)
*H04N 23/54* (2023.01)

(52) U.S. Cl.
CPC .............. *G06T 7/70* (2017.01); *H04N 23/54* (2023.01); *B60R 2300/10* (2013.01); *B60R 2300/30* (2013.01); *B60R 2300/806* (2013.01); *G06T 2207/30241* (2013.01); *G06T 2207/30252* (2013.01)

(58) Field of Classification Search
CPC . B60R 1/003; B60R 2300/10; B60R 2300/30; B60R 2300/806; G05D 1/0212; H04N 5/2253
USPC .......................................................... 701/41
See application file for complete search history.

(56) References Cited

U.S. PATENT DOCUMENTS

| | | | |
|---|---|---|---|
| 5,949,331 | A | 9/1999 | Schofield et al. |
| 6,498,620 | B2 | 12/2002 | Schofield et al. |
| 6,690,268 | B2 | 2/2004 | Schofield et al. |
| 7,038,577 | B2 | 5/2006 | Pawlicki et al. |
| 7,720,580 | B2 | 5/2010 | Higgins-Luthman |
| 7,855,755 | B2 | 12/2010 | Weller et al. |
| 9,085,261 | B2 | 7/2015 | Lu et al. |
| 9,264,672 | B2 | 2/2016 | Lynam |
| 9,446,713 | B2 | 9/2016 | Lu et al. |
| 9,558,409 | B2 | 1/2017 | Pliefke et al. |
| 10,071,687 | B2 | 9/2018 | Ihlenburg et al. |
| 10,086,870 | B2 | 10/2018 | Gieseke et al. |
| 10,099,614 | B2 | 10/2018 | Diessner |
| 10,160,382 | B2 | 12/2018 | Pliefke et al. |
| 10,532,698 | B2 | 1/2020 | Potnis et al. |
| 10,552,976 | B2 | 2/2020 | Diessner et al. |
| 10,586,119 | B2 | 3/2020 | Pliefke et al. |
| 10,638,025 | B2 | 4/2020 | Gali et al. |
| 10,706,291 | B2 | 7/2020 | Diessner et al. |
| 10,733,757 | B2 | 8/2020 | Gupta et al. |
| 10,755,110 | B2 | 8/2020 | Bajpai |
| 11,417,116 | B2 | 8/2022 | Joseph et al. |
| 2014/0063197 | A1 | 3/2014 | Yamamoto et al. |
| 2014/0085472 | A1 | 3/2014 | Lu et al. |
| 2014/0160276 | A1 | 6/2014 | Pliefke et al. |
| 2014/0267688 | A1 | 9/2014 | Aich et al. |
| 2015/0002670 | A1 | 1/2015 | Bajpai |
| 2015/0210317 | A1* | 7/2015 | Hafner ................... B62D 13/06 701/41 |
| 2015/0217693 | A1 | 8/2015 | Pliefke et al. |
| 2016/0049020 | A1 | 2/2016 | Kuehnle et al. |
| 2017/0050672 | A1 | 2/2017 | Gieseke et al. |
| 2017/0174128 | A1 | 6/2017 | Hu et al. |
| 2017/0217372 | A1 | 8/2017 | Lu et al. |
| 2017/0254873 | A1 | 9/2017 | Koravadi |
| 2017/0280091 | A1 | 9/2017 | Greenwood et al. |
| 2017/0341583 | A1 | 11/2017 | Zhang et al. |
| 2018/0211528 | A1 | 7/2018 | Seifert |
| 2018/0215382 | A1 | 8/2018 | Gupta et al. |
| 2018/0253608 | A1 | 9/2018 | Diessner et al. |
| 2018/0276838 | A1 | 9/2018 | Gupta et al. |
| 2018/0276839 | A1 | 9/2018 | Diessner et al. |
| 2019/0016264 | A1 | 1/2019 | Potnis et al. |
| 2019/0039649 | A1 | 2/2019 | Gieseke et al. |
| 2019/0042864 | A1 | 2/2019 | Pliefke et al. |
| 2019/0064831 | A1 | 2/2019 | Gali et al. |
| 2019/0118860 | A1 | 4/2019 | Gali et al. |
| 2019/0143895 | A1 | 5/2019 | Pliefke et al. |
| 2019/0241126 | A1 | 8/2019 | Murad et al. |
| 2019/0275941 | A1 | 9/2019 | Lu et al. |
| 2019/0297233 | A1 | 9/2019 | Gali et al. |
| 2019/0329821 | A1 | 10/2019 | Ziebart et al. |
| 2019/0347498 | A1 | 11/2019 | Herman et al. |
| 2019/0347825 | A1 | 11/2019 | Gupta et al. |
| 2019/0375450 | A1* | 12/2019 | Medagoda ......... B62D 15/0285 |
| 2020/0017143 | A1 | 1/2020 | Gali |
| 2020/0334475 | A1 | 10/2020 | Joseph et al. |
| 2020/0356788 | A1 | 11/2020 | Joseph et al. |
| 2020/0361397 | A1 | 11/2020 | Joseph et al. |
| 2020/0406967 | A1 | 12/2020 | Yunus et al. |
| 2021/0023997 | A1 | 1/2021 | Vasoya |
| 2021/0034902 | A1 | 2/2021 | Assa et al. |
| 2021/0034903 | A1 | 2/2021 | Daga et al. |
| 2021/0078634 | A1 | 3/2021 | Jalalmaab et al. |
| 2021/0094473 | A1 | 4/2021 | Gali et al. |
| 2021/0170820 | A1 | 6/2021 | Zhang |
| 2021/0170947 | A1 | 6/2021 | Yunus et al. |

\* cited by examiner

VEHICULAR TRAILERING ASSIST SYSTEM

CROSS REFERENCE TO RELATED APPLICATION

The present application claims priority of U.S. provisional application Ser. No. 62/899,936, filed Sep. 13, 2019, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicular trailer assist systems is common and known. Examples of such known systems are described in U.S. Pat. Nos. 9,446,713 and 9,085,261, which are hereby incorporated herein by reference in their entireties.

SUMMARY OF THE INVENTION

The present invention provides a vehicular trailering assist or driving assistance system or vision system for a vehicle that utilizes one or more cameras (preferably one or more CMOS cameras) to capture image data representative of images exterior of the vehicle, and includes a camera disposed at a rear portion of a vehicle and having a field of view exterior of the vehicle, the field of view encompassing at least a portion of a trailer hitched to the vehicle. The system also includes an electronic control unit (ECU) comprising electronic circuitry and associated software. The electronic circuitry includes an image processor operable to process image data captured by the camera and the image data captured by the camera is representative of the trailer hitched to the vehicle. The ECU, responsive to processing at the ECU of image data captured by the camera, during a reversing maneuver of the vehicle and trailer while the vehicle is in motion and is towing the trailer, determines a desired or target or selected trajectory for the trailer (such as a trajectory or path for the trailer to follow from the current location to a desired or target or selected destination determined by the system or selected by the user). The ECU may also, responsive to determining the desired or target or selected trajectory for the trailer, determine a lateral path deviation of the trailer. The lateral path deviation of the trailer represents a deviation of a current trajectory of the trailer from the desired or target or selected trajectory for the trailer.

The ECU, responsive to determining the lateral path deviation of the trailer, determines a trailer heading angle correction and determines a desired or target or selected trailer angle of the trailer relative to the vehicle based on the current trailer angle of the trailer and the trailer heading angle correction. The desired or target or selected trailer angle will direct the trailer toward the desired or target or selected trajectory for the trailer. Responsive to determination by the ECU of the desired or target or selected trailer angle of the trailer, and during the reversing maneuver of the vehicle and trailer, the ECU controls steering of the vehicle to direct the trailer to achieve the desired or target or selected trailer angle and move the trailer toward the desired or target or selected trajectory for the trailer.

These and other objects, advantages, purposes and features of the present invention will become apparent upon review of the following specification in conjunction with the drawings.

DESCRIPTION OF THE PREFERRED EMBODIMENTS

A vehicle and trailer maneuvering system or maneuver assist system and/or driving assist system operates to capture images exterior of the vehicle and trailer being towed by the vehicle and may process the captured image data to determine a path of travel for the vehicle and trailer and to detect objects at or near the vehicle and in the predicted path of the vehicle, such as to assist a driver of the vehicle in maneuvering the vehicle and trailer in a rearward direction. The trailering assist system includes an image processor or image processing system that is operable to receive image data from one or more cameras and may provide an output to a display device for displaying images representative of the captured image data. Optionally, the trailering assist system may provide display, such as a rearview display or a top down or bird's eye or surround view display or the like.

Figure 1:
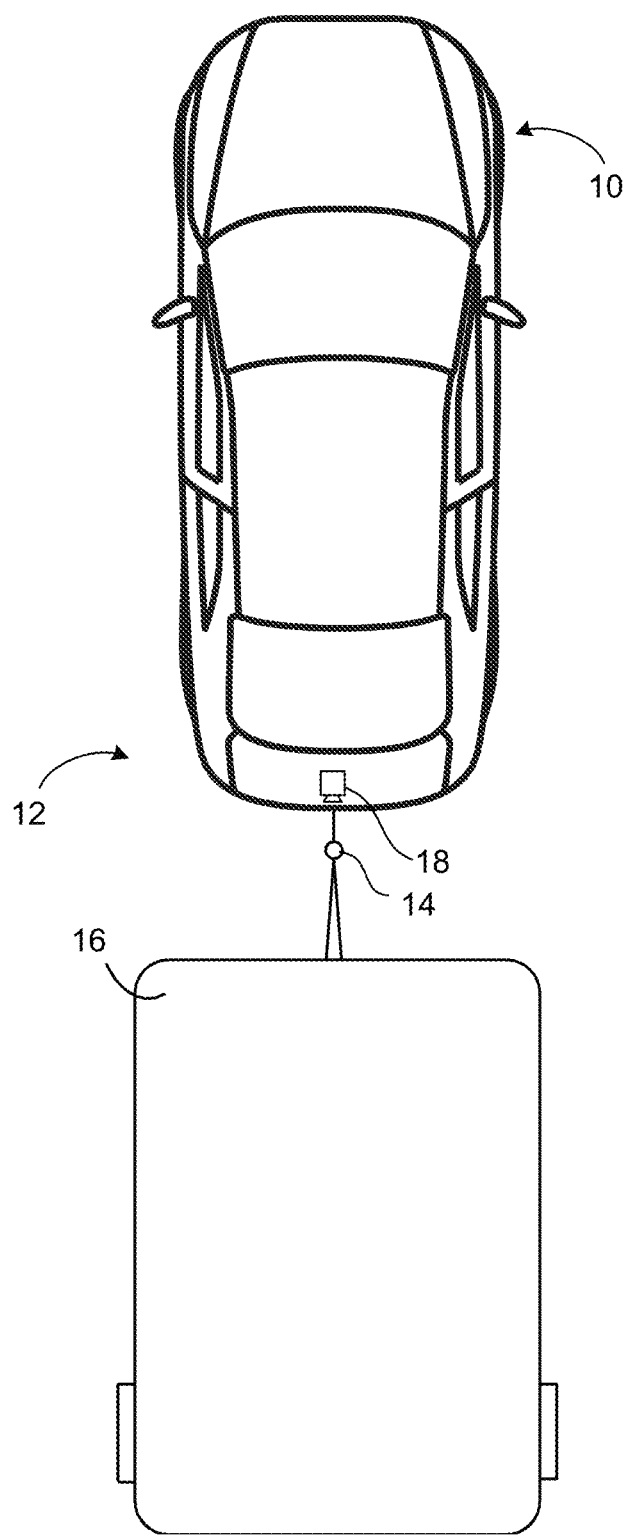
FIG. 1 is a plan view of a vehicle with a trailering assist system that is operable to steer a trailer along a trailer direction in accordance with the present invention.

Referring now to the drawings and the illustrative embodiments depicted therein, a vehicle 10 includes a vehicle and trailer maneuvering system or maneuver assist system and/or driving assist system or trailer hitching system 12 that is operable to assist in backing up or reversing the vehicle with a hitched trailer hitched to the vehicle at a hitch 14, and may maneuver the vehicle 10 and trailer 16 along a desired or target or selected destination trajectory. The trailer maneuver assist system 12 includes at least one exterior viewing vehicle-based imaging sensor or camera, such as a rearward viewing imaging sensor or camera 18 (and the system may optionally include multiple exterior viewing imaging sensors or cameras, such as a sideward/rearward viewing camera at respective sides of the vehicle), which captures image data representative of the scene exterior of the vehicle 10, which includes the hitch 14 and/or trailer 16, with the camera 18 having a lens for focusing images at or onto an imaging array or imaging plane or imager of the camera (FIG. 1). Optionally, a forward viewing camera may be disposed at the windshield of the vehicle 10 and view through the windshield and forward of the vehicle 10, such as for a machine vision system (such as for traffic sign recognition, headlamp control, pedestrian detection, collision avoidance, lane marker detection and/or the like). The trailer maneuver assist system 12 includes a control or electronic control unit (ECU) having electronic circuitry and associated software, with the circuitry including a data processor or image processor that is operable to process image data captured by the camera or cameras and may detect objects or the like and/or provide displayed images at a display device for viewing by the driver of the vehicle (the control and/or display device may be part of or incorporated in or at an interior rearview mirror assembly of the vehicle, or the control and/or the display device may be disposed elsewhere at or in the vehicle). The data transfer or signal communication from the camera to the ECU may comprise any suitable data or communication link, such as a vehicle network bus or the like of the equipped vehicle.

Trailer reverse assisting systems have been employed in many passenger cars and trucks to assist drivers for trailer reversing. Typically, a rear camera is used to estimate the trailer angle and the driver can set the desired or target trajectory curvature using a small extra knob that is mounted on a front panel of the vehicle. From there, the trailer reverse assisting system steers the vehicle-trailer to follow the set curvature.

Recently, automated straight reversing (ASR) is a new solution that assists the driver in situations where the trailer is aligned with its target path (e.g., when launching a boat or parking a trailer in a narrow driveway). In this case, the ASR system steers the vehicle to smoothly and stably follow the path with only small deviations for wide ranges of reverse speed and trailer size. These ASR systems may perform a variety of tasks and functions. For example, an ASR system may regulate the trailer angle to zero or any other desired trailer angle, navigate the trailer to track the target straight trajectory with minimal deviation, help prevent the jackknife phenomena, and/or warn the driver in undesirable situations (e.g., potential collisions). In some examples, the system may include reactivation after driver override, which allows the driver to adjust the target trajectory on-the-fly and the system will follow the new trailer heading after reactivating. To accomplish all these tasks, ASR systems may include a trailer angle estimation system, a vehicle-trailer localization system, a steer-by-wire system, and/or an automatic straight reversing control scheme. Implementations herein provide a corresponding control scheme that may receive inputs from a trailer angle estimation system, a vehicle-trailer localization system, and then, based on these inputs, actuate a steer-by-wire system.

Figure 2:
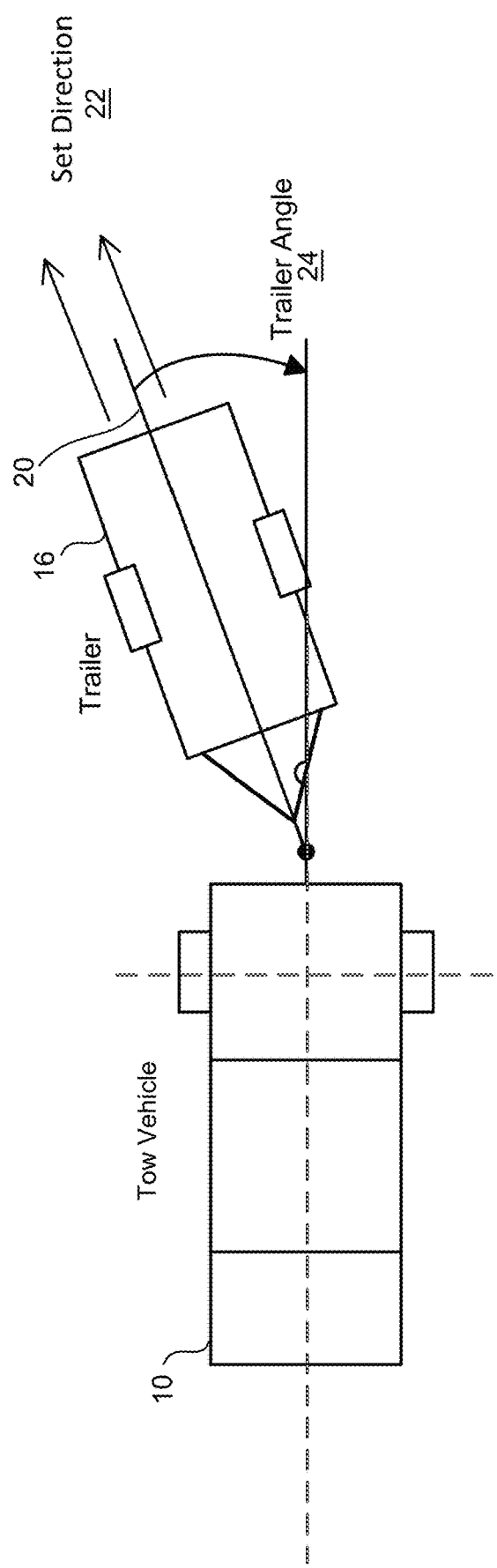
FIG. 2 is a plan view of the vehicle and trailer with a trailer angle and trailer direction.

Referring now to FIG. 2, the trailering assist system or trailer back up assist system 12 controls the vehicle 10 to direct the trailer 16 hitched or attached to the vehicle 10 in the current direction or orientation of the trailer 16 with reference to a center line axis 20 of the trailer 16. The desired or target orientation of the trailer 16 with reference the center line axis 20 of the trailer 16 is referred to as a trailer direction or set direction 22. The set direction 22 may be set by the user via actuation of a user input (e.g., a touch screen, control knob, etc.). The system 12 may determine the trailer direction 22 via, for example, trailer angle detection (such as by using aspects of the systems described in U.S. Pat. Nos. 9,085,261 and/or 6,690,268, and/or U.S. Publication Nos. US-2019-0064831; US-2019-0016264; US-2018-0276839; US-2018-0276838; US-2018-0253608; US-2018-0215382; US-2017-0254873; US-2017-0050672; US-2015-0217693; US-2014-0160276; US-2014-0085472 and/or US-2015-0002670, which are hereby incorporated herein by reference in their entireties).

Trailer angle detection determines the trailer angle 24 through the use of rear view camera 18 by measuring or determining or estimating the angle 24 between the towing vehicle 10 and the trailer 16 via processing of image data captured by the rear camera 18 of the towing vehicle 10. After determining the set direction 22, the system 12 controls steering of the towing vehicle (e.g., turns the steering wheel) to direct the trailer when the vehicle 10 is moving or maneuvering in a reverse direction. That is, the system, based on the current trailer angle, maneuvers steering of the vehicle to align the trailer with the set direction. A driver of the vehicle 10 may be responsible for controlling acceleration/braking (i.e., speed) and gear selection of the towing vehicle 10.

Figure 3:
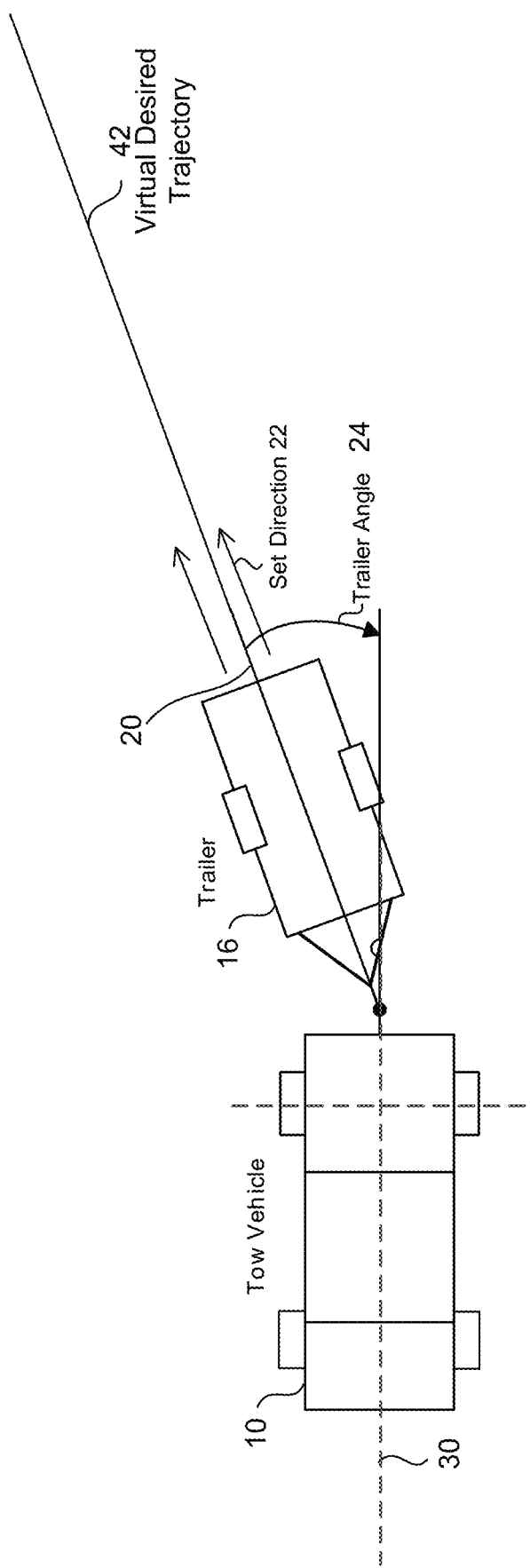
FIG. 3 is a plan view of the vehicle and trailer with a virtual desired trajectory.

Referring now to FIG. 3, the system 12 may determine a virtual desired or target trajectory 42 such as by using aspects of the systems described in U.S. Publication No. US-2020-0017143, which is hereby incorporated herein by reference in its entirety. The virtual target trajectory 42 may, for example, be calculated by the system 12 with reference to the center of a trailer axle of the trailer 16 at the trailer's current location. The virtual target trajectory 42 may align with the set direction 22. Upon straightening the vehicle 10 and trailer 16 (so that the longitudinal axis of the trailer is generally aligned with the longitudinal axis of the vehicle), the system 12 controls the vehicle 10 for continuing the maneuver of the trailer 16 along the virtual target trajectory 42 (and in the set direction 22) until the driver halts the maneuver (e.g., via applying the vehicle's brake or otherwise instructing the system 12 to halt).

Figure 4A:
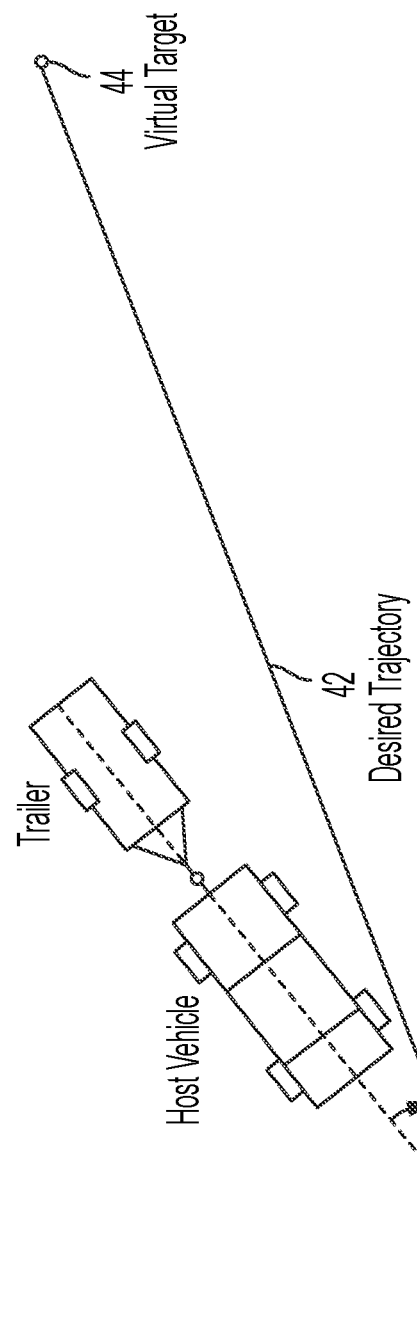
FIG. 4A is a plan view of the vehicle and trailer with a heading deviation from the virtual desired trajectory to a virtual target.
Figure 4B:
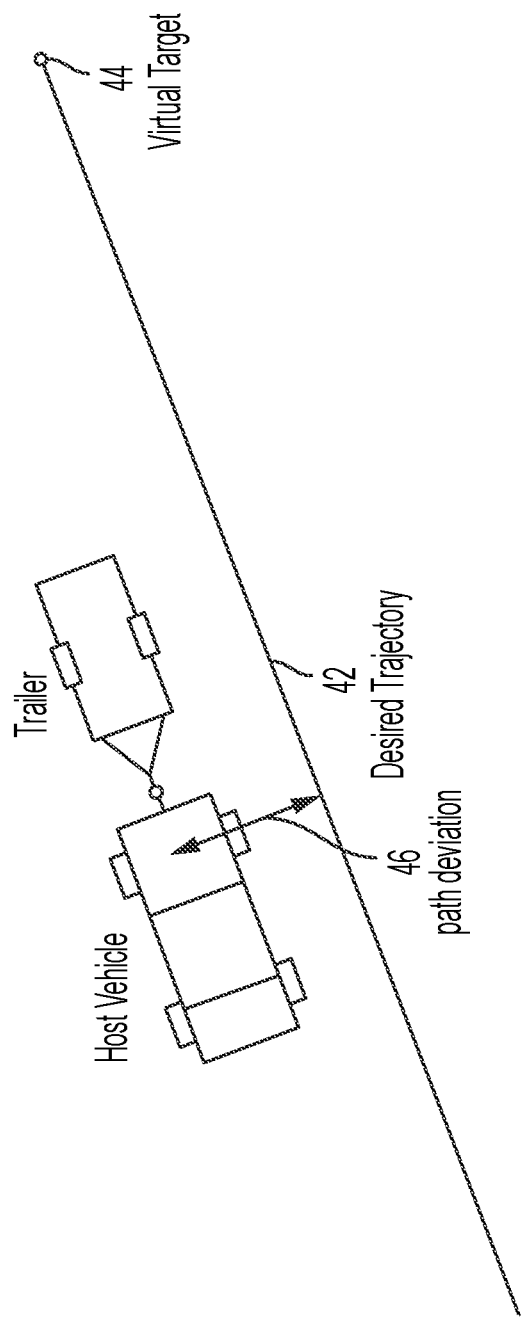
FIG. 4B is a plan view of the vehicle and trailer with a lateral offset deviation from the virtual desired trajectory to the virtual target.

Referring now to FIGS. 4A and 4B, desirable capabilities of an ASR include: regulating the trailer-vehicle relative angle ($\gamma$) (FIG. 7) to zero or tracking desired trailer angle ($\gamma_{des}$) (FIG. 6A), controlling the trailer heading angle to track the initial trailer heading angle ($\beta_{init}$) (FIG. 6A) or desired or target heading angle ($\beta_{des}$) (FIG. 6A), and regulating the trailer lateral deviation ($e_p$) (FIG. 5) from the target straight trajectory. In some examples, other capabilities include preventing jackknifes, warning the driver in undesirable situations, navigating to a virtual target 44, and driver override (i.e., allowing the driver to adjust the target trajectory on-the-fly and follow the new trailer heading).

To accurately steer the vehicle, the system must account for both trailer-vehicle relative angle $\gamma$ (i.e., the trailer angle 24) and trailer heading $\beta$, as receiving feedback on the trailer angle alone is insufficient. For example, when the trailer heading is deviated from due to a disturbance, but the trailer angle is still equal to zero (i.e., $\gamma$ converges to zero), the trailer-angle controller may not correct the steering (FIG. 4A). As shown in FIG. 4A, the trailer heading experienced a slight deviation, and despite the trailer angle being zero, the trailer fails to track the target trajectory 42 and will not arrive at the virtual target 44. Similarly, if there is a lateral offset, but the trailer angle is still equal to zero (i.e., $\gamma$ converges to zero), the trailer-angle controller may also not correct the steering (FIG. 4B). As shown in FIG. 4B, despite the trailer angle again being zero, the trailer will not arrive at the virtual target 44 because of the lateral offset 46.

Figure 5:
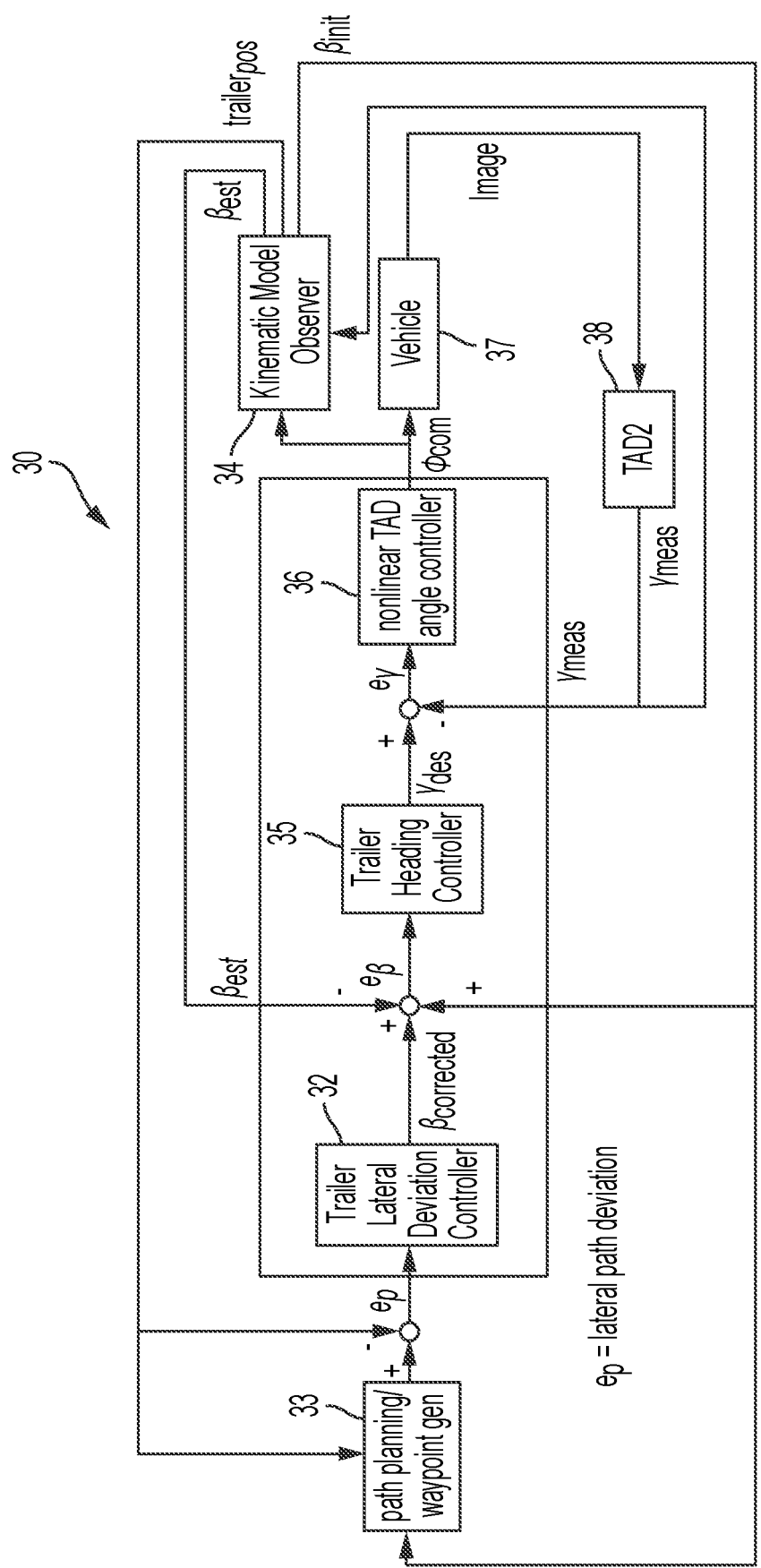
FIG. 5 is a block diagram of a control scheme in accordance with the present invention.
Figure 6A:
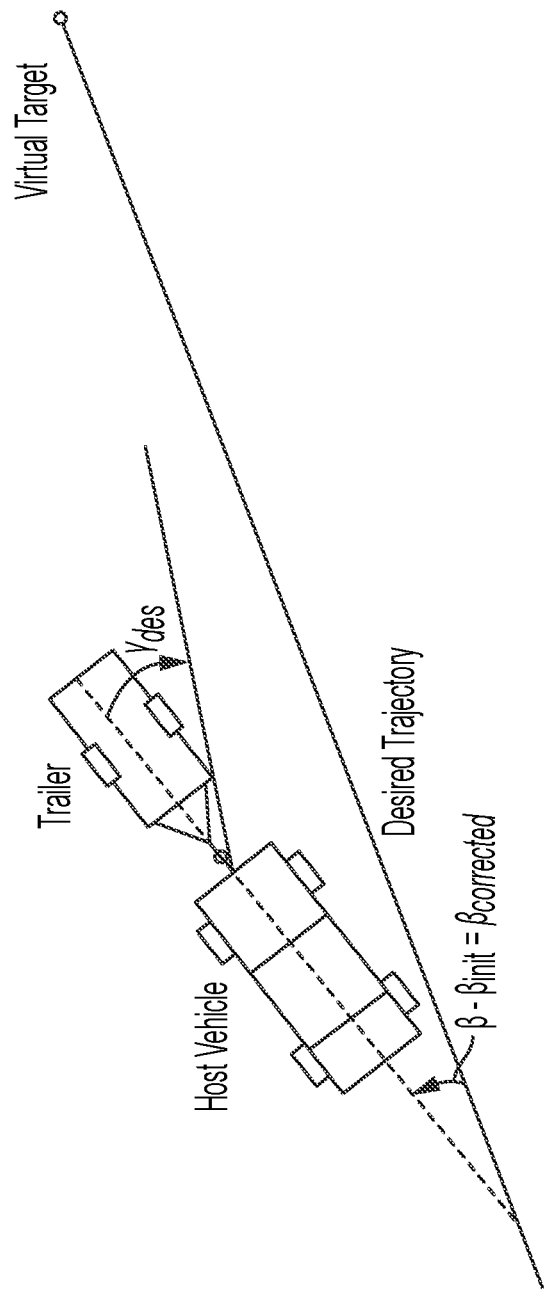
FIG. 6A is another plan view of the vehicle and trailer with a heading deviation from a virtual desired trajectory.

Referring now to FIG. 5, the system may include a three layer cascade control scheme 30. The first or outer layer or level includes lateral position tracking using a trailer lateral deviation controller 32. Lateral path deviation ($e_p$) may be determined by drawing a straight line from the initial position of the trailer in the direction of the initial trailer heading (FIG. 6A). The trailer lateral deviation controller 32 may receive the lateral path deviation from a path planning/waypoint generator 33 and from a kinematic model observer 34 (e.g., that determines the current position of the trailer). The trailer lateral deviation controller 32, in response to the lateral path deviation input, outputs a lateral deviation correction ($\beta_{corrected}$), which specifies how much the target or initial trailer heading needs adjusted or changed to compensate for the determined lateral path deviation. The lateral deviation correction may be determined using Equation 1 which includes a control gain $K_p$.

$$\beta_{corrected} = K_p e_p \tag{1}$$

Figure 6B:
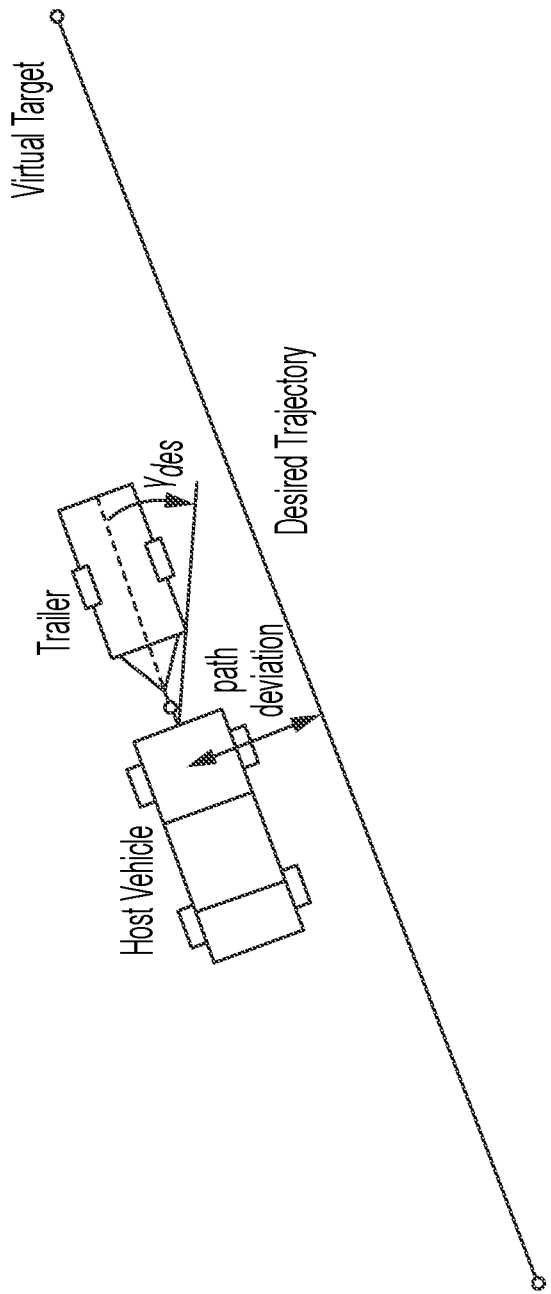
FIG. 6B is another plan view of the vehicle and trailer with a lateral offset deviation from the virtual desired trajectory.

The second layer (or middle layer) of the three layer cascade control scheme 30 includes trailer heading tracking using a trailer heading controller 35, as shown in FIGS. 6A and 6B, to follow the initial heading plus any compensation or correction from the first layer (i.e. $\beta_{corrected}$). The desired or target trailer angle ($\gamma_{des}$) may be determined by the trailer heading controller 35 using Equations 2 and 3 using control gain $K_h$.

$$e_\beta \beta_{init} + \beta_{corrected} - \beta_{est} \tag{2}$$

$$\gamma_{des} = K_h e_\beta \tag{3}$$

The estimated trailer heading ($\beta_{est}$) is the estimation from an internal observer (e.g., the kinematic model observer 34). The trailer heading controller 35 outputs the desired trailer angle ($\gamma_{des}$).

Figure 7:
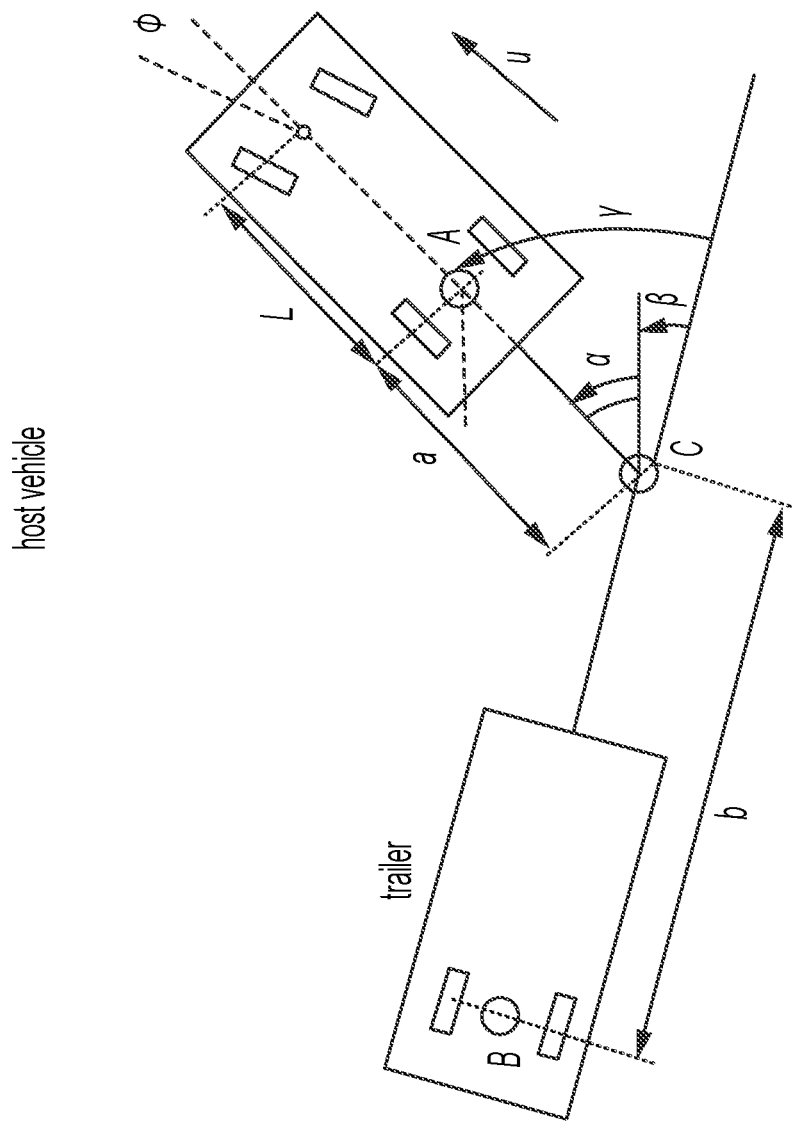
FIG. 7 is a plan view of a vehicle and trailer with variables used for kinematic calculations.

Referring back to FIG. 5, the third layer includes a trailer relative angle controller 36. In some examples, the controller is a nonlinear trailer angle detection (TAD) angle controller 36. Referring now to FIG. 7, in some implementations, the angle controller 36 uses equations 4, 5, and 6, to determine kinematics of the host vehicle and trailer headings. The host vehicle heading is represented by $\alpha$ and the trailer heading is represented by $\beta$. The trailer relative angle is represented by $\gamma$ ($\gamma$ may be equivalent to $\alpha-\beta$). The host vehicle velocity is represented by u, the host vehicle wheel base is represented by L, and the distance from the rear axle to the hitch of the host vehicle is represented by a. The front wheel angle is represented by $\phi$ and the beam length of the vehicle is represented by b.

$$\dot{a} = \frac{u_{HV}}{L}\tan(\phi) \tag{4}$$

$$\dot{\beta} = \frac{u_{HV}}{b}\frac{a}{L}\tan(\phi)\cos(\alpha-\beta) - \frac{u_{HV}}{b}\sin(\alpha-\beta) \tag{5}$$

$$\gamma = \pi + \alpha - \beta \tag{6}$$

Using equations 7, 8, and 9, the angle controller 36 may determine the kinematics of the relative angle between the vehicle and trailer (i.e., the trailer angle 24) with kinematic analysis.

$$\dot{\gamma} = \frac{u}{L}\tan(\phi) - \frac{u}{b}\frac{a}{L}\tan(\phi)\cos(\alpha-\beta) + \frac{u}{b}\sin(\alpha-\beta) \tag{7}$$

$$\dot{\gamma} = \frac{u}{L}\tan(\phi) + \frac{u}{b}\frac{a}{L}\tan(\phi)\cos(\gamma) - \frac{u}{b}\sin(\gamma) \tag{8}$$

$$\dot{\gamma} = \frac{u}{L}\tan(\phi) + \frac{u}{b}\frac{a}{L}\tan(\phi)\cos(\gamma) - \frac{u}{b}\sin(\gamma) \tag{9}$$

Using these kinematics, the angle controller 36 may perform stability analysis using the Lyapunov-candidate-function V of Equation 10. By ensuring that the system is stable, the angle controller 36 avoids, for example, a jackknife situation.

$$V = \frac{1}{2}\gamma^2 \tag{10}$$

When $\gamma=0$, the system is at equilibrium. That is, $\gamma=0$ (i.e., when the trailer angle 24 is 0 degrees) is the equilibrium point of the system (i.e., the vehicle and trailer). A system is globally asymptotically stable when the Lyapunov-candidate-function V is globally positive definite (i.e., 0 at $\gamma=0$ and positive at all other values of $\gamma$) and the derivative of the Lyapunov-candidate-function is globally negative definite (i.e., 0 at $\gamma=0$ and negative at all other values of $\gamma$). The derivative of the Lyapunov-candidate-function is determined using Equations 11-13.

$$\dot{V} = \dot{\gamma}\gamma \tag{11}$$

$$\dot{V} = \left(\frac{u}{L}\tan(\phi) + \frac{u}{b}\frac{a}{L}\tan(\phi)\cos(\gamma) - \frac{u}{b}\sin(\gamma)\right)\gamma \tag{12}$$

$$\dot{V} = \left(\frac{u}{L}\tan(\phi) + \frac{ua}{bL}\tan(\phi)\cos(\gamma) - \frac{u}{b}\sin(\gamma)\right)\gamma \tag{13}$$

Using a substitution in Equation 14, the derivative of the Lyapunov-candidate-function may be simplified to Equation 15.

$$\left(\frac{u}{L}\tan(\phi) + \frac{ua}{bL}\tan(\phi)\cos(\gamma) - \frac{u}{b}\sin(\gamma)\right) = -K\gamma \tag{14}$$

$$\dot{V} = -K\gamma^2 \tag{15}$$

When the derivative of the Lyapunov-candidate-function of Equation 15 is negative definite, the system is globally asymptotic stable. From this stable condition, the front wheel angle may be determined using Equations 16-18. When the system is not stable, the system may determine a new desired trailer angle $\gamma$ and/or warn the operator of the vehicle. For example, the system may alert the operator that the desired maneuver is not possible.

$$\phi = \mathrm{atan}\left(\frac{L}{u + u\frac{a}{b}\cos(\gamma)}\left(\frac{u}{b}\sin(\gamma) - K\gamma\right)\right) \tag{16}$$

$$\dot{\gamma} = \left(\frac{u}{L}\tan\phi + \frac{u}{b}\frac{a}{L}\tan\phi\cos(\gamma - \gamma_{des}) - \frac{u}{b}\sin(\gamma - \gamma_{des})\right) \tag{17}$$

$$\phi = \mathrm{atan}\left(\frac{L}{u + u\frac{a}{b}\cos(\gamma - \gamma_{des})}\left[\frac{u}{b}\sin(\gamma - \gamma_{des}) - K(\gamma - \gamma_{des})\right]\right) \tag{18}$$

Referring again back to FIG. 5, the trailer relative angle controller 36 may transmit the determined front wheel angle to the vehicle steering controller 37 to turn the wheel to the determined angle which will stably guide the trailer toward the desired trajectory. Optionally, another trailer angle detection module 38 determines the current trailer angle (e.g., using image data captured by the camera) and feeds the determined angle back to the nonlinear angle controller 36 to continually check for stability.

Optionally, the controller 36 uses trailer relative angle control law determine the front wheel angle using Equation 19:

$$\phi = \operatorname{atan}\left(\frac{L}{u + u\frac{a}{b}\cos(\gamma)}\left[\frac{u}{b}\sin(\gamma) - K_\gamma(\gamma - \gamma_{des})\right]\right) \quad (19)$$

Here, the host vehicle heading is represented by α and the trailer heading is represented by β. The trailer relative angle is represented by γ (γ may be equivalent to α-β). The host vehicle velocity is represented by u, the host vehicle wheel base is represented by L, and the distance from the rear axle to the hitch of the host vehicle is represented by a. The front wheel angle is represented by ϕ and the beam length of the vehicle is represented by b. Control gain for the angle controller 36 is represented by $K_\gamma$. The control law (i.e., Equation 19) is derived from feedback linearization techniques for a nonlinear system. Using kinematic analysis, relative trailer angle dynamics may be derived from Equation 20:

$$\dot{\gamma} = \left(\frac{u}{L}\tan\phi + \frac{u}{b}\frac{a}{L}\tan\phi\cos\gamma - \frac{u}{b}\sin\gamma\right) \quad (20)$$

In order to eliminate any nonlinearity in the system, the nonlinear terms may be assumed to be replaced with variable v as shown in Equation 21:

$$\frac{u}{L}\tan\phi + \frac{u}{b}\frac{a}{L}\tan\phi\cos(\gamma) - \frac{u}{b}\sin(\gamma) = v \quad (21)$$

Thus, the control law is as shown in Equation 22:

$$\tan\phi = \frac{v + \frac{u}{b}\sin(\gamma)}{\left(\frac{u}{L} + \frac{ua}{bL}\cos(\gamma)\right)} \quad (22)$$

Based on this, the relative trailer angle dynamic would be linear as shown in Equation 23 and the steering angle control law as shown in Equation 24:

$$\dot{\gamma} = v = -k_\gamma(\gamma - \gamma_d) \quad (23)$$

$$\phi = \operatorname{atan}\left(\frac{L}{u + u\frac{a}{b}\cos(\gamma)}\left[\frac{u}{b}\sin(\gamma) - K_\gamma(\gamma - \gamma_{des})\right]\right) \quad (24)$$

The trailer relative angle controller 36 may transmit the determined front wheel angle (i.e., ϕ) to the vehicle steering controller 37 to turn the wheel to the determined angle which will guide the trailer toward the desired trajectory. That is, during a reversing maneuver, the ECU controls steering of the vehicle to achieve the target trailer angle and direct the vehicle and trailer back towards the target trajectory for the trailer so that the vehicle and trailer are again moving along the target trajectory. In some implementations, another trailer angle detection module 38 determines the current trailer angle (e.g., using image data captured by the camera) and feeds the determined angle back to the nonlinear angle controller 36 to continually check for stability.

Thus, the present invention provides a trailering assist system that includes a three layer cascade control scheme. The control scheme compensates for both trailer heading deviations and also lateral offset to direct a trailer toward a desired trajectory and/or desired target location. The system ensures that the steering is stable before commencing to ensure, for example, a jackknife situation is avoided.

The system may utilize aspects of the trailering assist systems or trailer angle detection systems or trailer hitch assist systems described in U.S. Pat. Nos. 10,638,025; 10,160,382; 10,086,870; 9,558,409; 9,446,713; 9,085,261 and/or 6,690,268, and/or U.S. Publication Nos. US-2020-0017143; US-2019-0347825; US-2019-0118860; US-2019-0064831; US-2019-0042864; US-2019-0039649; US-2019-0143895; US-2019-0016264; US-2018-0276839; US-2018-0276838; US-2018-0253608; US-2018-0215382; US-2017-0254873; US-2017-0217372 and/or US-2015-0002670, and/or U.S. patent applications, Ser. No. 16/946,542, filed on Jun. 26, 2020, Ser. No. 15/929,535, filed on May 8, 2020, and/or Ser. No. 16/850,300, filed on Apr. 16, 2020, which are all hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the system may include a display for displaying images captured by one or more of the imaging sensors for viewing by the driver of the vehicle while the driver is normally operating the vehicle. Optionally, for example, the system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular trailering assist system, the vehicular trailering assist system comprising:
a camera disposed at a rear portion of a vehicle and viewing at least rearward of the vehicle, wherein, with a trailer hitched at a trailer hitch of the vehicle, the camera views at least a portion of the trailer hitched at the trailer hitch of the vehicle;
an electronic control unit (ECU) comprising electronic circuitry and associated software;
wherein the electronic circuitry comprises an image processor operable to process image data captured by the camera, and wherein, with the trailer hitched at the trailer hitch of the vehicle, image data captured by the camera includes image data of the portion of the trailer hitched at the trailer hitch of the vehicle;
wherein the ECU, responsive to processing at the ECU of image data captured by the camera, and during a reversing maneuver of the vehicle and trailer while the vehicle is in motion and the trailer is hitched at the trailer hitch of the vehicle, determines a target trajectory for the trailer;
wherein the ECU, responsive to determining the target trajectory for the trailer, determines a lateral path deviation of the trailer, and wherein the lateral path deviation of the trailer represents a lateral offset of the current position of the trailer from the target trajectory for the trailer;
wherein the ECU, responsive to determining the lateral path deviation of the trailer, determines a trailer heading angle correction based on the lateral path deviation of the trailer;
wherein the ECU, responsive to determining the trailer heading angle correction, and based on (i) a current angle of the trailer relative to the vehicle, (ii) an initial angle of the trailer relative to the vehicle and (iii) the trailer heading angle correction, determines a target trailer angle of the trailer relative to the vehicle that, when achieved, will direct the trailer toward the target trajectory for the trailer;
wherein, responsive to determining the target trailer angle, the ECU determines, during the reversing maneuver of the vehicle and trailer while the vehicle is in motion and the trailer is hitched at the trailer hitch of the vehicle, whether the target trailer angle is stable;
wherein the ECU, responsive to determination by the ECU that the target trailer angle is not stable, generates a warning for an operator of the vehicle; and
wherein, responsive to determination by the ECU that the target trailer angle is stable, and during the reversing maneuver of the vehicle and trailer, the ECU controls steering of the vehicle to achieve the target trailer angle and direct the vehicle and the trailer towards the target trajectory for the trailer.

2. The vehicular trailering assist system of claim 1, wherein the ECU determines whether the target trailer angle is globally asymptotically stable.

3. The vehicular trailering assist system of claim 1, wherein the ECU uses a candidate-Lyapunov-function to determine the stability of the target trailer angle.

4. The vehicular trailering assist system of claim 1, wherein, during the reversing maneuver of the vehicle and trailer while the vehicle is in motion and the trailer is hitched at the trailer hitch of the vehicle, the ECU determines kinematics of the current heading of the trailer.

5. The vehicular trailering assist system of claim 1, wherein, during the reversing maneuver of the vehicle and trailer while the vehicle is in motion and the trailer is hitched at the trailer hitch of the vehicle, the ECU determines kinematics of the current trailer angle of the trailer relative to the vehicle.

6. The vehicular trailering assist system of claim 1, wherein the ECU utilizes a feedback linearization technique for nonlinear systems to control steering of the vehicle.

7. The vehicular trailering assist system of claim 1, wherein the ECU determines the target trajectory for the trailer responsive to actuation of a user input.

8. The vehicular trailering assist system of claim 1, wherein, during the reversing maneuver of the vehicle and trailer while the vehicle is in motion and the trailer is hitched at the trailer hitch of the vehicle, the lateral offset of the current position of the trailer is determined via a kinematic model observer.

9. The vehicular trailering assist system of claim 1, wherein, during the reversing maneuver of the vehicle and trailer while the vehicle is in motion and the trailer is hitched at the trailer hitch of the vehicle, the ECU determines the trailer heading angle correction based at least in part on an estimated trailer heading determined via a kinematic model observer.

10. A vehicular trailering assist system, the vehicular trailering assist system comprising:
a camera disposed at a rear portion of a vehicle and viewing at least rearward of the vehicle, wherein, with a trailer hitched at a trailer hitch of the vehicle, the camera views at least a portion of the trailer hitched at the trailer hitch of the vehicle;
an electronic control unit (ECU) comprising electronic circuitry and associated software;
wherein the electronic circuitry comprises an image processor operable to process image data captured by the camera, and wherein, with the trailer hitched at the trailer hitch of the vehicle, image data captured by the camera includes image data of the portion of the trailer hitched at the trailer hitch of the vehicle;
wherein the ECU, responsive to processing at the ECU of image data captured by the camera, and during a reversing maneuver of the vehicle and trailer while the vehicle is in motion and the trailer is hitched at the trailer hitch of the vehicle, determines a target trajectory for the trailer;
wherein the ECU, responsive to determining the target trajectory for the trailer, determines a lateral path deviation of the trailer, and wherein the lateral path deviation of the trailer represents a lateral offset of the current position of the trailer from the target trajectory for the trailer;
wherein the ECU, responsive to determining the lateral path deviation of the trailer, determines a trailer heading angle correction based on the lateral path deviation of the trailer;
wherein the ECU, responsive to determining the trailer heading angle correction, and based on (i) a current angle of the trailer relative to the vehicle, (ii) an initial angle of the trailer relative to the vehicle and (iii) the trailer heading angle correction, determines a target trailer angle of the trailer relative to the vehicle that, when achieved, will direct the trailer toward the target trajectory for the trailer;
wherein the ECU, responsive to determining the target trailer angle, determines, during the reversing maneuver of the vehicle and trailer while the vehicle is in motion and the trailer is hitched at the trailer hitch of the vehicle, a stability of the target trailer angle using a candidate-Lyapunov-function;
wherein the ECU determines whether the target trailer angle is globally asymptotically stable;
wherein the ECU, responsive to determination by the ECU that the target trailer angle is not stable, generates a warning for an operator of the vehicle; and
wherein, responsive to determination by the ECU of the target trailer angle of the trailer and determination by the ECU that the target trailer angle is globally asymptotically stable, and during the reversing maneuver of the vehicle and trailer, the ECU controls steering of the vehicle to achieve the target trailer angle and direct the vehicle and the trailer towards the target trajectory for the trailer.

11. The vehicular trailering assist system of claim 10, wherein, during the reversing maneuver of the vehicle and trailer while the vehicle is in motion and the trailer is hitched at the trailer hitch of the vehicle, the ECU determines kinematics of the current heading of the trailer.

12. The vehicular trailering assist system of claim 10, wherein, during the reversing maneuver of the vehicle and trailer while the vehicle is in motion and the trailer is hitched at the trailer hitch of the vehicle, the ECU determines kinematics of the current trailer angle of the trailer relative to the vehicle.

13. The vehicular trailering assist system of claim 10, wherein the ECU utilizes a feedback linearization technique for nonlinear systems to control steering of the vehicle.

14. The vehicular trailering assist system of claim 10, wherein the ECU determines the target trajectory for the trailer responsive to actuation of a user input.

15. The vehicular trailering assist system of claim 10, wherein, during the reversing maneuver of the vehicle and trailer while the vehicle is in motion and the trailer is hitched at the trailer hitch of the vehicle, the lateral offset of the current position of the trailer is determined via a kinematic model observer.

16. A vehicular trailering assist system, the vehicular trailering assist system comprising:
a camera disposed at a rear portion of a vehicle and viewing at least rearward of the vehicle, wherein, with a trailer hitched at a trailer hitch of the vehicle, the camera views at least a portion of the trailer hitched at the trailer hitch of the vehicle;
an electronic control unit (ECU) comprising electronic circuitry and associated software;
wherein the electronic circuitry comprises an image processor operable to process image data captured by the camera, and wherein, with the trailer hitched at the trailer hitch of the vehicle, image data captured by the camera includes image data of the portion of the trailer hitched at the trailer hitch of the vehicle;
wherein the ECU, responsive to processing at the ECU of image data captured by the camera, and during a reversing maneuver of the vehicle and trailer while the vehicle is in motion and the trailer is hitched at the trailer hitch of the vehicle, determines a target trajectory for the trailer;
wherein the ECU, responsive to determining the target trajectory for the trailer, determines a lateral path deviation of the trailer, and wherein the lateral path deviation of the trailer represents a lateral offset of the current position of the trailer from the target trajectory for the trailer;

wherein the ECU, responsive to determining the lateral path deviation of the trailer, determines a trailer heading angle correction based on the lateral path deviation of the trailer;

wherein the ECU, responsive to determining the trailer heading angle correction, and based on (i) a current angle of the trailer relative to the vehicle, (ii) an initial angle of the trailer relative to the vehicle and (iii) the trailer heading angle correction, determines a target trailer angle of the trailer relative to the vehicle that, when achieved, will direct the trailer toward the target trajectory for the trailer;

wherein, during the reversing maneuver of the vehicle and trailer while the vehicle is in motion and the trailer is hitched at the trailer hitch of the vehicle, the ECU determines kinematics of the current heading of the trailer and kinematics of the current trailer angle of the trailer relative to the vehicle;

wherein, responsive to determining the target trailer angle, the ECU determines, during the reversing maneuver of the vehicle and trailer while the vehicle is in motion and the trailer is hitched at the trailer hitch of the vehicle, whether the target trailer angle is stable;

wherein the ECU, responsive to determination by the ECU that the target trailer angle is not stable, generates a warning for an operator of the vehicle; and wherein, responsive to determination by the ECU that the target trailer angle is stable and determination by the ECU of the kinematics of the current heading of the trailer and the kinematics of the current trailer angle of the trailer relative to the vehicle, and during the reversing maneuver of the vehicle and trailer, the ECU controls steering of the vehicle to achieve the target trailer angle and direct the vehicle and the trailer towards the target trajectory for the trailer.

17. The vehicular trailering assist system of claim 16, wherein the ECU utilizes a feedback linearization technique for nonlinear systems to control steering of the vehicle.

18. The vehicular trailering assist system of claim 16, wherein the ECU determines the target trajectory for the trailer responsive to actuation of a user input.

19. The vehicular trailering assist system of claim 16, wherein, during the reversing maneuver of the vehicle and trailer while the vehicle is in motion and the trailer is hitched at the trailer hitch of the vehicle, the ECU determines the trailer heading angle correction based at least in part on an estimated trailer heading determined via a kinematic model observer.

* * * * *